(12) United States Patent
Li

(10) Patent No.: US 11,971,146 B2
(45) Date of Patent: Apr. 30, 2024

(54) PLANT LAMP DEVICE WITH ADJUSTABLE SPECTRUM AND SPECTRUM RATIO OPERATING METHOD THEREOF

(71) Applicant: Meng Li, Shenzhen (CN)

(72) Inventor: Meng Li, Shenzhen (CN)

( * ) Notice: Subject to any disclaimer, the term of this patent is extended or adjusted under 35 U.S.C. 154(b) by 265 days.

(21) Appl. No.: 17/730,234

(22) Filed: Apr. 27, 2022

(65) Prior Publication Data

US 2023/0349517 A1 Nov. 2, 2023

(51) Int. Cl.
*F21S 4/28* (2016.01)
*A01G 7/04* (2006.01)
*F21V 23/00* (2015.01)
*F21Y 113/10* (2016.01)

(52) U.S. Cl.
CPC ............... *F21S 4/28* (2016.01); *A01G 7/045* (2013.01); *F21V 23/003* (2013.01); *F21Y 2113/10* (2016.08)

(58) Field of Classification Search
CPC .... F21S 4/28; F21S 4/20; A01G 7/045; A01G 7/04; F21V 23/003; F21V 99/00; F21Y 2113/10; F21Y 2113/13; F21Y 2113/17; F21Y 2105/14
See application file for complete search history.

(56) References Cited

U.S. PATENT DOCUMENTS

| | | | | |
|---|---|---|---|---|
| 2009/0288340 A1* | 11/2009 | Hess | ...................... | A01G 7/045 |
| | | | | 47/58.1 LS |
| 2017/0135290 A1* | 5/2017 | Sahni | ...................... | F21V 23/02 |
| 2019/0082613 A1* | 3/2019 | Eisele | .................. | H05B 47/115 |
| 2021/0274722 A1* | 9/2021 | Tracy | ...................... | F21V 23/06 |
| 2021/0289711 A1* | 9/2021 | Matsumoto | ......... | F21V 23/0464 |

* cited by examiner

*Primary Examiner* — Bao Q Truong

(57) ABSTRACT

A plant lamp device with adjustable spectrum includes a light bar, a power supply and a controller. The controller and the power supply are electrically connected to the light bar. The light bar includes light beads emitting red light, blue light, far-red light, violet light, green light, and orange light. The light beads include a first bead group and a second bead group having different of red-to-blue-light irradiance ratios. The controller is used to turn on or off the light bar, so that the plant lamp device operates the first bead group to generate first growth spectrum, or operates the first bead group and the second bead group together to generate second growth spectrum, thereby meeting the needs of the plant growth stage, and switching between the first growth spectrum and the second growth spectrum.

6 Claims, 5 Drawing Sheets

PLANT LAMP DEVICE WITH ADJUSTABLE SPECTRUM AND SPECTRUM RATIO OPERATING METHOD THEREOF

BACKGROUND OF THE INVENTION

1. Field of the Invention

The present invention relates to a lamp to illuminate for plant growth, and more particularly to a plant lamp with controllable spectrum.

2. Description of the Related Art

Industrial hemp is the hemp with a THC content of less than 0.3%; the industrial hemp and its extracts are widely applied in medical, industrial and food industries; especially cannabidiol (CBD), one of extracts of industrial hemp, is a good antioxidant and neuroprotective agent to relieve anxiety, pain and inflammation, and can be used to treat epilepsy.

Industrial hemp is a plant which needs strong light irradiation and has high requirements for light irradiation. The light intensity not meeting the growth requirement may adversely affect normal growth of industrial hemp, so artificial lamps or plant lamps are usually used to provide supplementary irradiation for the growth needs of industrial hemp, to increase the content of the extract, thereby increasing the original single annual harvest to multiple annual harvests.

Conventional artificial lamps (plant lamps) mainly include sodium vapor lamp, which is also called HPS with yellow light at 589 nm, and LED lamp. Compared with HPS, the LED lamp have advantages of lower heat generation and lower noise in operation, and does not burn plants. According to the journal data reported that using the LED lamp has 30%-40% higher HPS extracts production than using the UPS (Magagnini G, Grassi G, Kotiranta S. The Effect of Light Spectrum on the Morphology and Cannabinoid Content of *Cannabis sativa* L.[J]. Medical *Cannabis* and Cannabinoids, 2018, 1(1), 19-27).

In order to implement a constant red-to-blue-light ratio, the existing plant light has fixed number of red-light beads and blue-light beads which are disposed in a specific arrangement, so that the target species plants are covered with the composite spectrum of red light and blue light by scattering of light bead. Although the overall ratio of red light to blue light can be obtained by matching the number of light beads and the regular arrangement, it is still limited by the scattering angle, so it fails to cover each planting point with the spectrum of the expected ratio. As a result, the failure of irradiating all planting points with the same spectrum causes problems in planting and growing.

SUMMARY OF THE INVENTION

An objective of the present invention is to provide a plant lamp device with adjustable spectrum, and the plant lamp device includes a light bar, a power supply and a controller.

The controller and the power supply are electrically connected to the light bar, and the power supply provides power for operation of the light bar.

The light bar includes light beads emitting red light, blue light, far-red light, violet light, green light and orange light, respectively; the light beads include a first bead group and a second bead group having different red-to-blue-light irradiance ratios and disposed in an interlaced arrangement in the light bar.

The controller controls the light bar to turn on or turn off, so that the plant lamp device is able to turn on the first bead group only to generate a first growth spectrum, or turn on the first bead group and the second bead group together to generate a second growth spectrum, to meet the needs of the plant growth stage, thereby controlling the plant lamp device to switch between the first growth spectrum and the second growth spectrum.

The practical operating steps of the plant lamp device with adjustable spectrum includes: controlling a controller to turn on a first light bead group of a light bar, to make the first bead group irradiates growth spectrum on seedling plants and adult plants, wherein a red-to-blue light irradiance ratio of the first bead group is 3.9:1; controlling the controller to turn on the first light bead group and a second light bead group which are disposed in the light bar in interlaced arrangement, and the growth spectrum of the first bead group is different from growth spectrum of the second bead group and applied to irradiate plants in flowering stage, the red-to-blue-light irradiance ratio of the first bead group and the second bead group on an irradiated area is 7:1.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
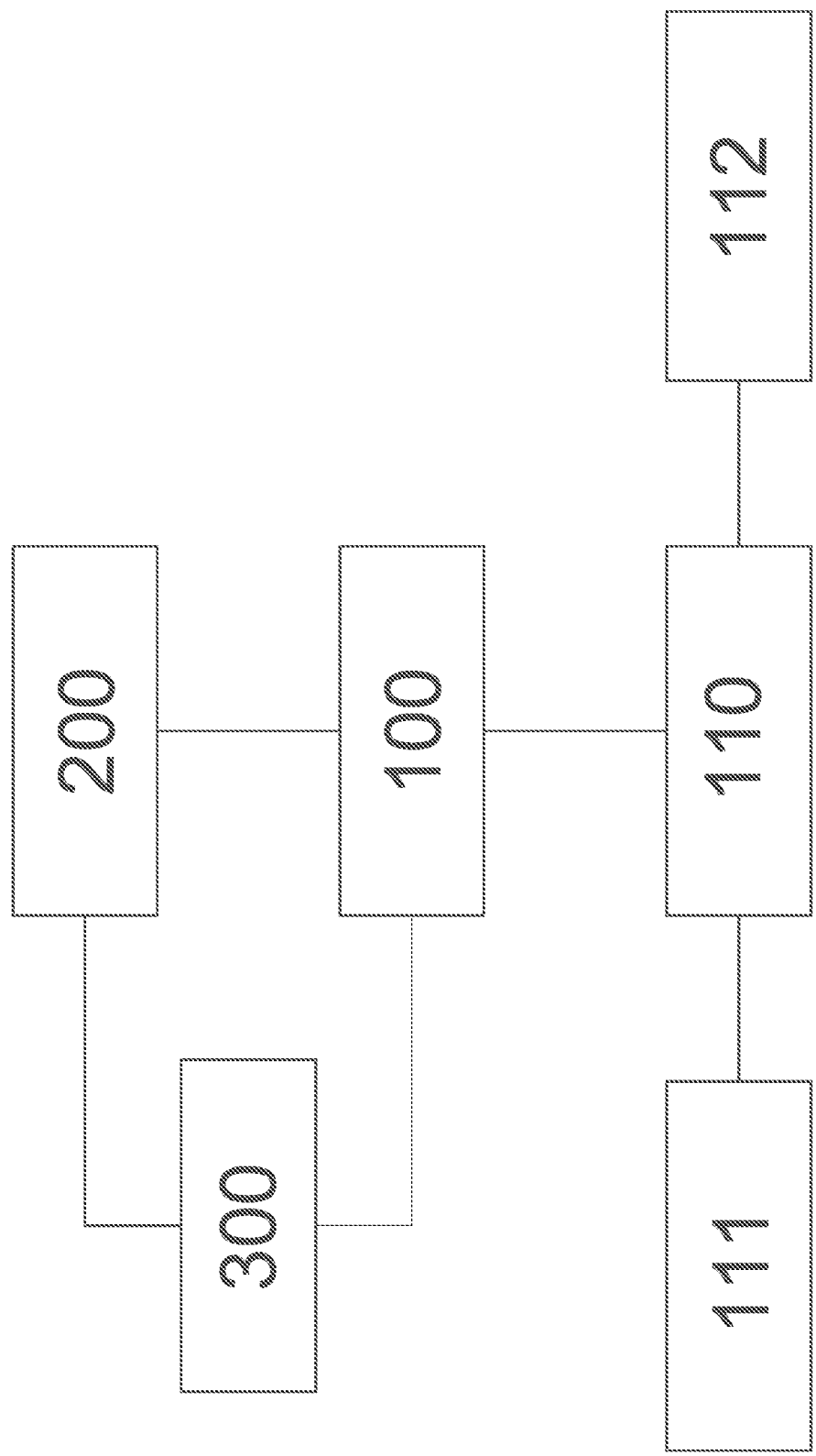
FIG. 1 is a block diagram of a plant lamp device with adjustable spectrum, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 5, which show a plant lamp device with adjustable spectrum, and the plant lamp device includes a light bar 100, a power supply 200 and a controller 300.

The controller 300 and the power supply 200 are electrically connected to the light bar 100, and the power supply 200 provides power for operation of the light bar 100.

Figure 2:
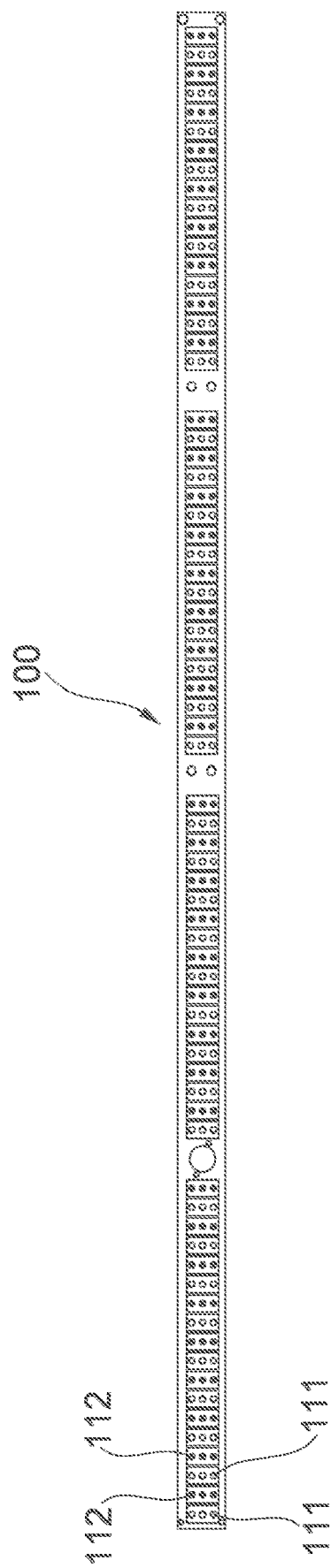
FIG. 2 is a schematic view of arrangement of light bead of a light bar, according to the present invention.
Figure 3:
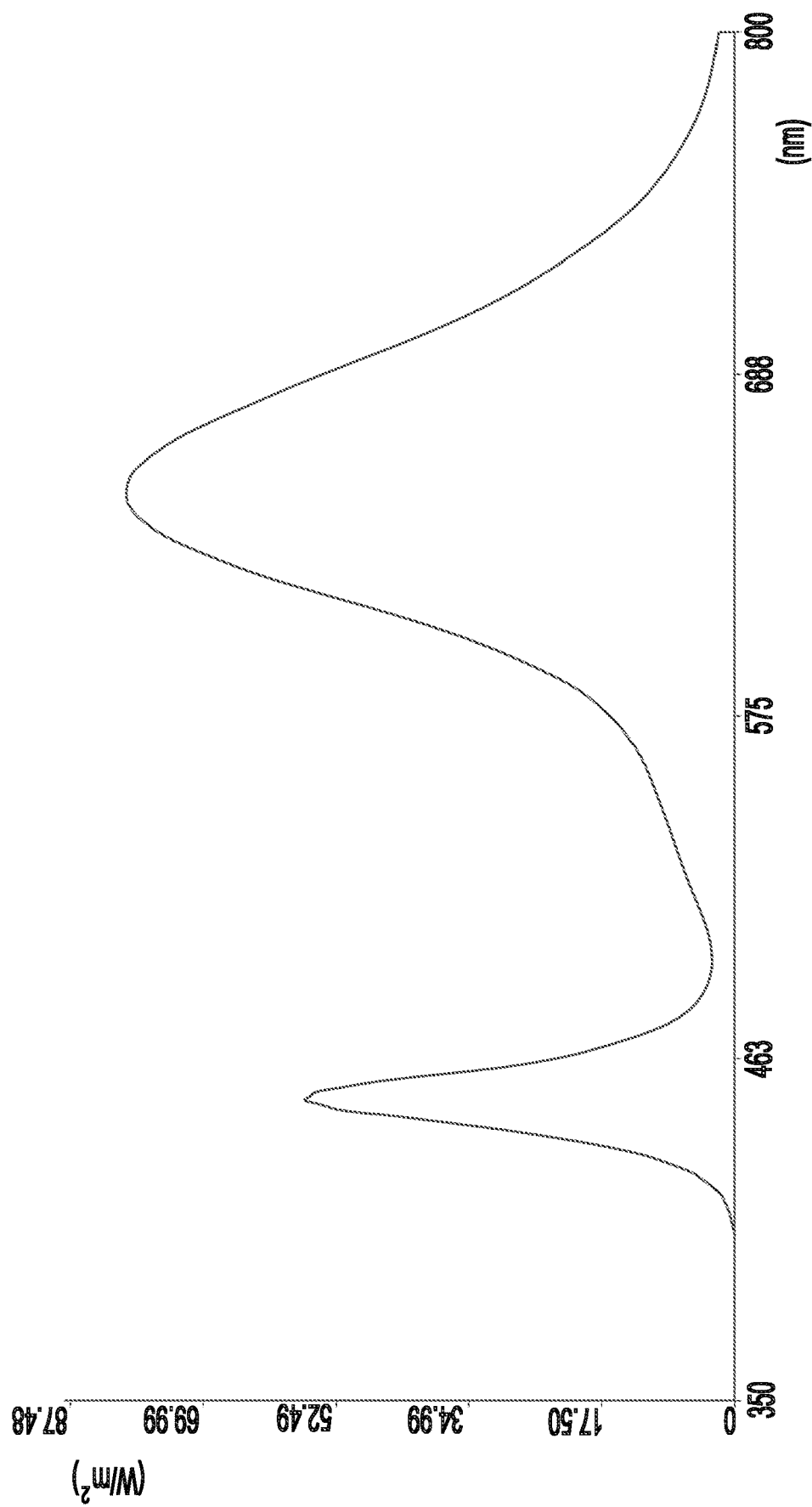
FIG. 3 is a diagram showing a detected spectrum of a first bead group of a light bead, according to the present invention.
Figure 4:
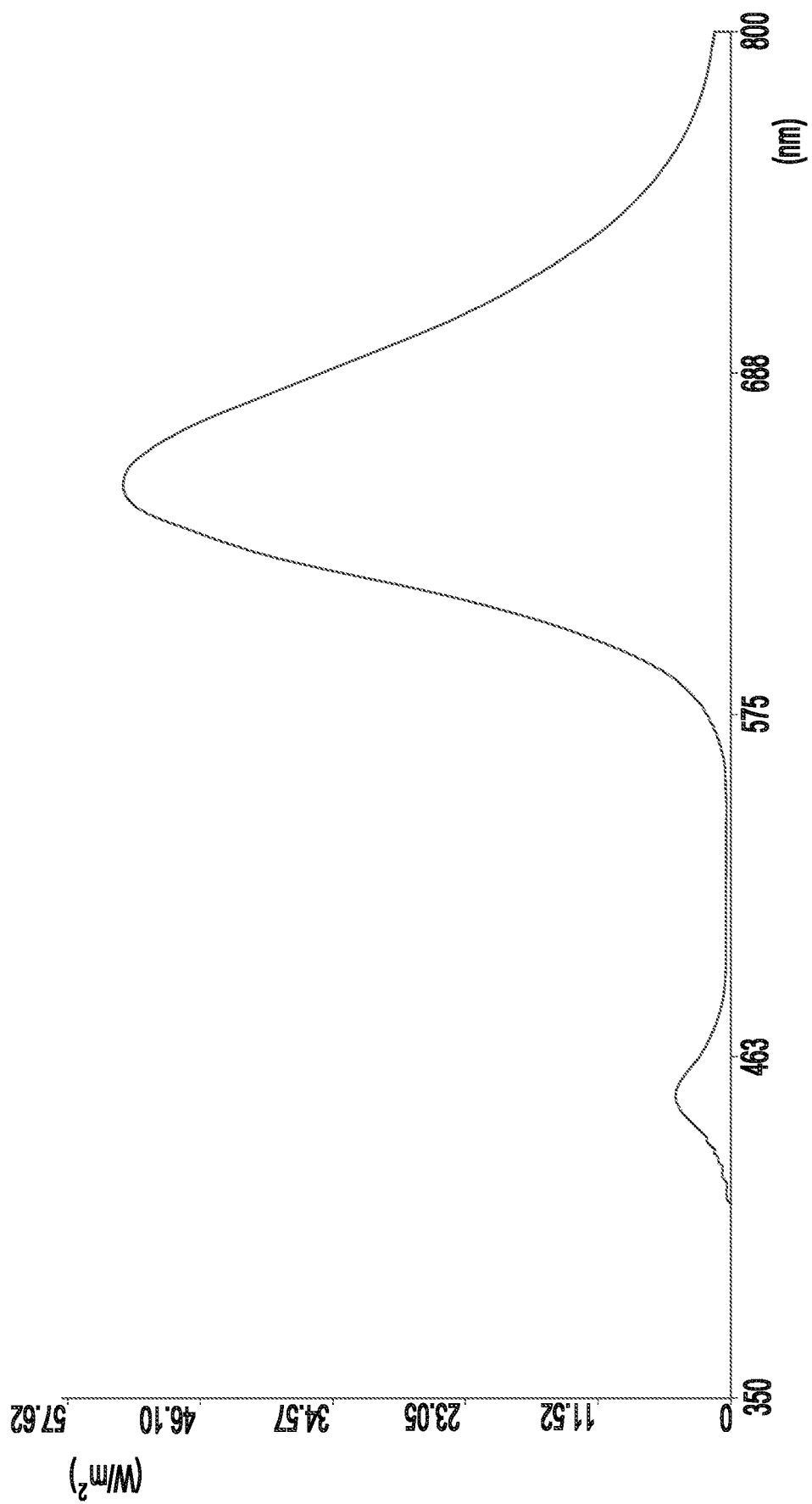
FIG. 4 is a diagram showing a detected spectrum of a second bead group of a light bead, according to the present invention.
Figure 5:
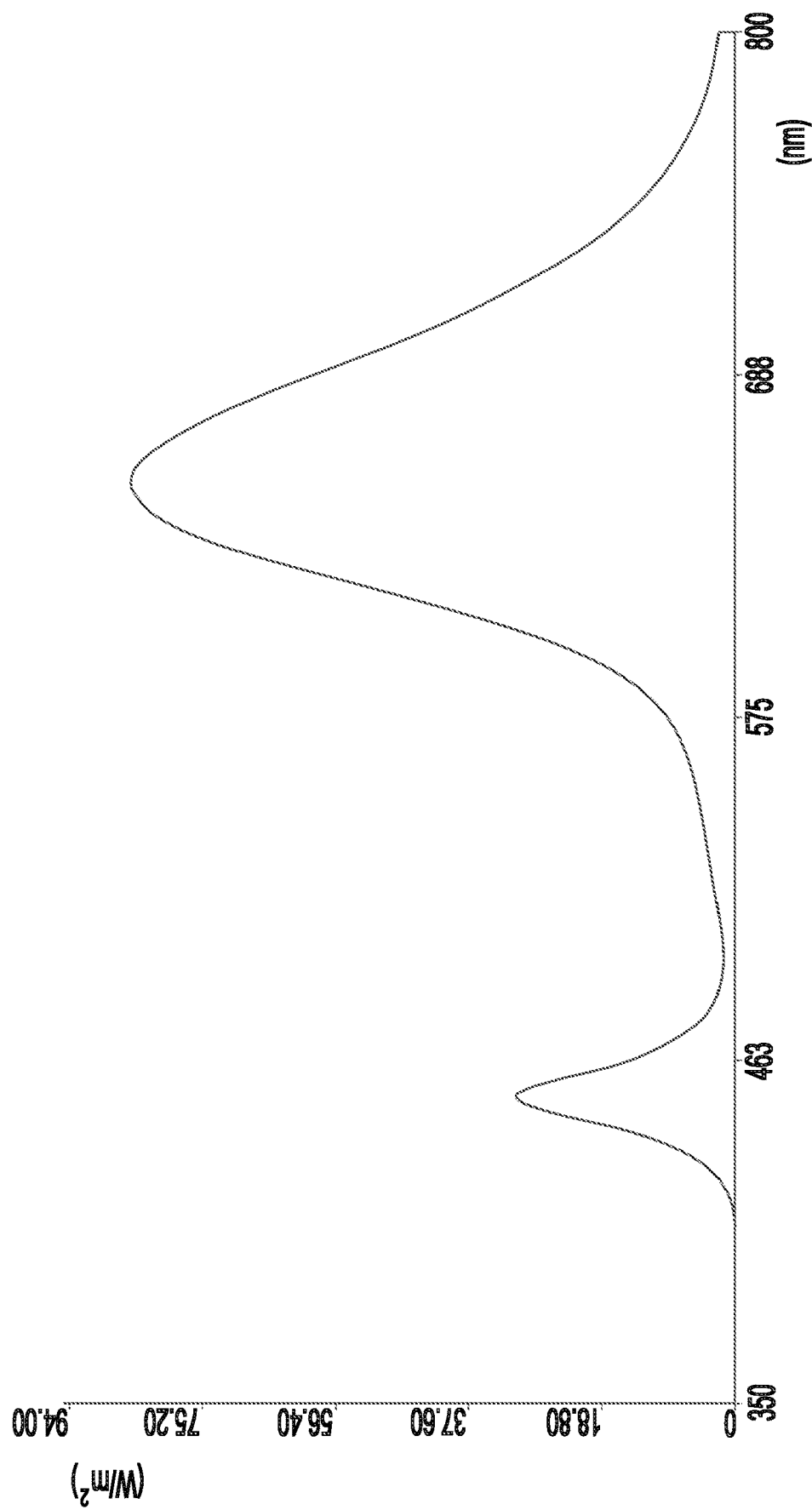
FIG. 5 is a diagram showing a detected spectrum of a first bead group and a second bead group operating at the same time, according to the present invention.

The light bar 100 includes light beads 110 emitting red light, blue light, far-red light, violet light, green light and orange light, respectively. The light beads 110 include a first bead group 111 and a second bead group 112 having different red-to-blue-light irradiance ratios and disposed in an interlaced arrangement in the light bar 100, as shown in FIG. 2.

In practical operation, the controller 300 controls the light bar 100 to turn on or turn off, so that the plant lamp device of the present invention can turn on the first bead group 111 only to generate a first growth spectrum, or turn on the first bead group 111 and the second bead group 112 together to generate a second growth spectrum, to meet the needs of the plant growth stage, thereby controlling the plant lamp device to switch between the first growth spectrum and the second growth spectrum.

With the above-mentioned structure and operation, the plant lamp device of the present invention can turn on the first bead group 111 only to operate for seeding/adult plants, and the first bead group 111 is operated to irradiate light with spectrum meeting requirement of the seeding plants and adult plants. For the plant in the flowing stage, the first bead group 111 and the second bead group 112 are driven to operate together, the first bead group 111 and the second bead group 112 arranged in interlaced are able to irradiate light with the spectrum meeting the requirement of the plants in the flowering stage.

Industrial hemp can be an example of the above-mentioned plant.

The features of the present invention will be illustrated in detail in the following paragraphs. The first bead group 111 and the second bead group 112 are disposed in an interlaced arrangement in rows, and each row has three light beads, the light bead rows of the first bead group 111 and the second bead group 112 are disposed in an interlaced arrangement, that is, one row of the first bead group 111 is followed by one row of the second bead group 112 in a circular sequence. In this embodiment, the first bead group 111 and the second bead group 112 of the light bar 100 have a total of 72 rows with 216 light beads 110.

The first bead group 111 of the light bead 110 has a red-to-blue-light irradiance ratio of 3.9, the first irradiance (400 nm to 700 nm) vertically below the first bead group 111 by 15 cm is 58.2 W/m$^2$, the second irradiance (380 nm to 780 nm) of the first bead group is 58.2 W/m$^2$, red-light ratio is 49.6%, green-light ratio is 46.5%, blue-light ratio is 4%, the irradiance on chlorophyll A is 14.9 W/m$^2$, the irradiance on chlorophyll B is 12.9 W/m$^2$, far-red light irradiance is 7.9 W/m$^2$, blue-violet light irradiance is 10.2 W/m$^2$, yellow-green-light irradiance is 7.9 W/m$^2$, red-orange-light irradiance is 40 W/m$^2$, color temperature 1629K, primary wavelength is 700 nm, illumination is 9565.81x, color purity is 33.1%, peak wavelength is 647 nm, and half-wave width is 97.79 nm. As a result, the red-to-blue-light irradiance ratio of 3.9 can be implemented, and the requirement for far-red light, violet light, green light and orange light can also be met.

The second bead group 112 of the light bead 110 has the red-to-blue-light irradiance ratio of 27, the first irradiance (400 nm to 700 nm) vertically below the second bead group 112 by 15 cm is 44.7 W/m$^2$, the second irradiance (380 nm to 780 nm) of the second bead group is 44.7 W/m$^2$, red-light ratio is 83.8%, green-light ratio is 14.9%, blue-light ratio is 1.3%, the irradiance on chlorophyll A is 15.1 W/m$^2$, the irradiance on chlorophyll B is 7.1 W/m$^2$, far-red light irradiance is 10.4 W/m$^2$, blue-violet light irradiance is 1.5 W/m$^2$, yellow-green-light irradiance is 1.3 W/m$^2$, red-orange-light irradiance is 41.9 W/m$^2$, color temperature 1001K, primary wavelength is 700 nm, illumination is 4585.11x, color purity is 71.9%, peak wavelength is 654 nm, and half-wave width is 86.9 nm. As a result, the red-to-blue-light irradiance ratio of 27 can be implemented, and the requirement for far-red light, violet light, green light and orange light can be met.

The plant lamp device of the present invention is able to control the controller 300 to turn off the second bead group 112 of the light beads 110 for the seeding plants and adult plants and maintain the operation of the first bead group 111 only, so that the red-to-blue-light irradiance ratio is 3.9:1, the plant lamp device of the present invention emits red light, violet light, green light and orange light, the light spectrum ratio of the plant lamp device is light spectrum ratio of the first bead group 111, and light spectrum ratio for irradiation points can be balanced, thereby meeting the requirement for growth of seeding plants and adult plants.

For the plants in the flowering stage in which higher red-blue irradiance ratio is required for improve content of extracts, the plant lamp device of the present invention controls the controller 300 to activate operation of the first bead group 111 and the second bead group 112 together to regulate light spectrum ratio; the first bead group 111 and the second bead group 112 are operated at the same time, and distributed in interlace, and the red-to-blue-light irradiance ratio on the irradiated area is 7:1.

According to aforementioned operation, the plant lamp device of the present invention can have at least one of advantages below.

First, with the light ratio of each unit of the light beads 110, the plant lamp device of the present invention is able to implement the light spectrum having red light and blue light as primary components and other trace amount of lights, and the light spectrum is normally distributed.

Secondly, the light spectrums on various planting points are the unified to achieve the expected light spectrum ratio, and the parameters are unified to facilitate planting management.

Thirdly, the controller 300 controls the second bead group 112 of the light bead 110 to turn on or turn off, to regulate the illumination requirements of the seedling stage/adult stage and the flowering stage, thereby meeting the requirement for plant growth cycle and improving applicability of the device.

The effects of red light, blue light, far-red light, violet light, green light and orange light included in the light bead 110 of the present invention on plant growth will be described in the following paragraphs.

Red light: red light drives photosynthesis through photosynthetic pigment absorption, to promote stem elongation and carbohydrate synthesis of industrial hemp; through inhibiting extension of internode, red light promotes lateral branching and tillering, delays flower differentiation, and increases anthocyanins, chlorophyll and carotenoids.

Blue light: blue light makes industrial hemp consumes more nutrients to promote growth of the leaves thereof, and inhibit the growth of hemp stems, so that the height of industrial hemp can be dwarfed, and leaves of healthy industrial hemp can be obtained.

Green light: in conventional technology, the plants looks like slightly purple-grey under the compound light of red light and blue light, so it is difficult to diagnose plant diseases and disorders; this conventional problem can be solved by supplementing a small amount of green light; in addition, for industrial hemp with high light intensity and high density of canopy, green light is required.

Violet light: violet light improves the activity of antioxidant enzymes and delays the aging of industrial hemp.

Far-red light: with light quality regulation, red-to-far-red light ratio can be used to control industrial hemp morphology and plant height.

Yellow light: yellow light affects photosynthetic capacity and nutritional quality.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A plant lamp device with adjustable spectrum, comprising:
a light bar, comprising light beads, wherein the light beads emits red light, blue light, far-red light, violet light, and green light, and orange light, the light beads comprises a first bead group and a second bead group, and the first bead group and the second bead group have different red-to-blue-light irradiance ratios and are disposed in an interlaced arrangement in the light bar;
a power supply, configured to provide power for operation of the light bar; and
a controller, configured to control the light bar to turn on or turn off, wherein the controller and the power supply are electrically connected to the light bar.

2. The plant lamp device with adjustable spectrum according to claim 1, wherein the first bead group of the light beads has a red-to-blue-light irradiance ratio of 3.9, the first irradiance (400 nm to 700 nm) vertically under the first bead group by 15 cm is 58.2 W/m$^2$, the second irradiance (380 nm to 780 nm) of the first bead group is 58.2 W/m$^2$, red-light ratio is 49.6%, green-light ratio is 46.5%, blue-light ratio is 4%, irradiance on chlorophyll A is 14.9 W/m$^2$, irradiance on chlorophyll B is 12.9 W/m$^2$, far-red light irradiance is 7.9 W/m$^2$, blue-violet light irradiance is 10.2 W/m$^2$, yellow-green-light irradiance is 7.9 W/m$^2$, red-orange-light irradiance is 40 W/m$^2$, color temperature is 1629K, primary wavelength is 700 nm, illumination is 9565.81x, color purity is 33.1%, peak wavelength is 647 nm, and half-wave width is 97.7 nm.

3. The plant lamp device with adjustable spectrum according to claim 2, wherein the second bead group of the light bead has a red-to-blue-light irradiance ratio of 27, a first irradiance (400-700 nm) vertically under the second bead group by 15 cm is 44.7 W/m$^2$, a second irradiance (380 nm to 780 nm) of the second bead group is 44.72 W/m$^2$, red-light ratio is 83.8%, green-light ratio is 14.9%, blue-light ratio is 1.3%, irradiance on chlorophyll A is 15.1 W/m$^2$, irradiance on chlorophyll B is 7.1 W/m$^2$, far-red light irradiance is 10.4 W/m$^2$, blue-violet light irradiance is 1.5 W/m$^2$, yellow-green-light irradiance is 1.3 W/m$^2$, red-orange-light irradiance is 41.9 W/m$^2$, color temperature is 1001K, primary wavelength is 700 nm, illumination is 4585.11x, color purity is 71.9%, peak wavelength is 654 nm, and half-wave width is 86.9 nm.

4. The plant lamp device with adjustable spectrum according to claim 1, wherein the first bead group and the second bead group are arranged in rows every three beads, light beads of the first bead group and the second bead group are disposed in an interlaced arrangement.

5. The plant lamp device with adjustable spectrum according to claim 4, wherein the first bead group and the second bead group have a total of 72 rows with 216 light beads.

6. A spectrum ratio operating method for a plant lamp device, and the spectrum ratio operating method comprising:
controlling a controller to turn on a first light bead group of a light bar, to make the first bead group irradiate growth spectrum on seedling plants and adult plants, wherein a red-to-blue light irradiance ratio of the first bead group is 3.9:1; and
controlling the controller to turn on the first light bead group and a second light bead group which are disposed in the light bar in interlaced arrangement, and the growth spectrum of the first bead group is different from growth spectrum of the second bead group and applied to irradiate plants in flowering stage, the red-to-blue-light irradiance ratio of the first bead group and the second bead group on an irradiated area is 7:1.

\* \* \* \* \*